United States Patent
Ikehata et al.

(10) Patent No.: US 11,322,750 B2
(45) Date of Patent: May 3, 2022

(54) SURFACE MODIFIED PLATINUM OR PLATINUM ALLOY CATALYST FOR OXYGEN REDUCTION REACTION

(71) Applicant: TOYOTA MOTOR ENGINEERING & MANUFACTURING NORTH AMERICA, INC., Plano, TX (US)

(72) Inventors: Yuta Ikehata, Ann Arbor, MI (US); Masaya Kobayashi, Aichi (JP); Tomoyuki Nagai, Ann Arbor, MI (US); Hongfei Jia, Ann Arbor, MI (US); Hisao Kato, Aichi (JP)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 256 days.

(21) Appl. No.: 16/563,376

(22) Filed: Sep. 6, 2019

(65) Prior Publication Data
US 2020/0343562 A1    Oct. 29, 2020

Related U.S. Application Data

(60) Provisional application No. 62/838,059, filed on Apr. 24, 2019.

(51) Int. Cl.
*H01M 4/90* (2006.01)
*H01M 8/1004* (2016.01)
*H01M 8/10* (2016.01)

(52) U.S. Cl.
CPC ....... *H01M 4/9008* (2013.01); *H01M 4/9075* (2013.01); *H01M 8/1004* (2013.01); *H01M 2008/1095* (2013.01)

(58) Field of Classification Search
CPC ............ H01M 4/9008; H01M 4/9075; H01M 8/1004; H01M 2008/1095
See application file for complete search history.

(56) References Cited

U.S. PATENT DOCUMENTS

| 5,780,701 A | 7/1998 | Kaska et al. |
| 6,191,297 B1 | 2/2001 | Batz-Sohn et al. |
| 6,465,671 B1 | 10/2002 | Bae et al. |

(Continued)

FOREIGN PATENT DOCUMENTS

| CN | 105854946 | 7/2018 |
| CN | 108864439 | 11/2018 |

(Continued)

OTHER PUBLICATIONS

Grate et. al. Anal. Chem, 2003, 75, 1868-1879 (Year: 2003).*

(Continued)

*Primary Examiner* — Alexander Usyatinsky
(74) *Attorney, Agent, or Firm* — Oblon, McClelland, Maier & Neustadt, L.L.P.

(57) ABSTRACT

An oxygen reduction reaction (ORR) catalyst, a membrane-electrode assembly and a polymer electrolyte membrane fuel cell containing the catalyst are provided. The ORR catalyst is a solid catalyst on a carbon support and the solid catalyst contains platinum metal or a platinum alloy metal having a surface complexed with a monodentate thiol ligand comprising an aromatic or heteroaromatic ring containing at least one of a bromide and an iodide substituent.

16 Claims, 22 Drawing Sheets

(56) References Cited

U.S. PATENT DOCUMENTS

| | | | |
|---|---|---|---|
| 7,714,322 B2 | 5/2010 | Sandhu | |
| 7,897,817 B2 | 3/2011 | Uozumi et al. | |
| 8,753,895 B2 | 6/2014 | Lee et al. | |
| 10,164,274 B2 * | 12/2018 | Duncan | H01M 8/04067 |
| 2003/0096156 A1 * | 5/2003 | Asaoka | H01M 4/8605 |
| | | | 429/505 |
| 2006/0263675 A1 * | 11/2006 | Adzic | H01M 4/92 |
| | | | 429/424 |
| 2010/0129728 A1 * | 5/2010 | Morimoto | H01M 4/921 |
| | | | 429/483 |
| 2011/0129762 A1 * | 6/2011 | Lee | C01B 32/05 |
| | | | 429/524 |
| 2016/0211537 A1 * | 7/2016 | Duncan | H01M 8/04731 |
| 2016/0308220 A1 * | 10/2016 | Qi | H01M 4/92 |
| 2018/0057945 A1 | 3/2018 | Lin et al. | |

FOREIGN PATENT DOCUMENTS

| | | |
|---|---|---|
| CN | 108993594 | 12/2018 |
| JP | 4370399 | 9/2009 |
| KR | 10-1759433 | 7/2017 |

OTHER PUBLICATIONS

Kahsar et. al. "Control of Metal Catalyst Selectivity through Specific Noncovalent Molecular Interactions" J. Amer. Chem. Soc., 2014, 136, 520-526 (Year: 2014).*

* cited by examiner

Amine group (-NH$_2$)

- Oleylamine

J Phys. Chem. C2013, 4, 1304-1309

- Oleylamine

OA/PA(7/3)-Pt 4 shell

Langmuir 2014, 30, 2936-2942

SURFACE MODIFIED PLATINUM OR PLATINUM ALLOY CATALYST FOR OXYGEN REDUCTION REACTION

CROSS REFERENCE TO RELATED APPLICATIONS

This application claims priority to U.S. Provisional Application No. 62/838,059, filed Apr. 24, 2019, the disclosure of which is incorporated herein by reference in its entirety.

BACKGROUND

This disclosure is directed to platinum and platinum alloy catalysts having improved activity in promoting the oxygen reduction reaction, membrane-electrode assemblies containing the catalysts and polymer electrolyte membrane fuel cells (PEMFC) employing the catalysts.

Polymer electrolyte membrane fuel cells are of great interest as future power sources which can provide energy sufficient to power a vehicle with little or no negative environmental impact. The fuel source is hydrogen or a hydrogen source and oxygen as supplied by atmospheric air.

Even though PEMFCs are considered one of the most promising future power sources for automobiles, many technical issues must be overcome before a viable and commercially acceptable power unit can be produced. One major obstacle in this regard is the significant overpotential for the oxygen reduction reaction (ORR), which is the cathodic reaction in the fuel cell.

This reaction is generally represented by the following reaction scheme.

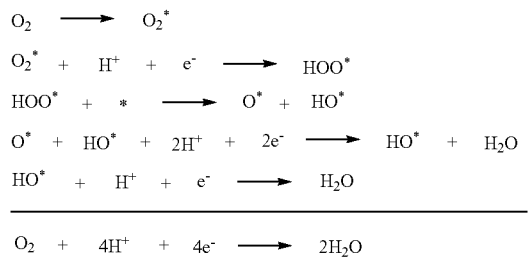

In the above scheme the symbol "*" represents interaction of the species with the catalyst surface active site. The overpotential for the ORR for the Pt catalyst is related to the strong adsorption of these species on the catalyst active site, thus reducing catalyst activity due to reduced number of active sites available.

Recent development in nanotechnology has led to synthesis of strictly controlled Pt nanoparticles (NPs), such as composition-controlled alloy nanoparticles. Previous efforts to enhance ORR activity of these NPs have been directed to modification of the surface structure and composition by encasing the catalyst in an ionic liquid or coating of the surface with organic molecules (see FIG. 2). Other efforts have been directed to Pt catalysis modified by organic ligands during the synthesis. However, to date it has been difficult to tune the ligand coverage except for changing Pt particle itself. Further, amine and thiol ligands which have been used have not provided sufficient catalyst performance improvement (see FIGS. 3 and 4).

Therefore, there is a need to find Pt and/or Pt alloy catalysts having significantly improved activity in the ORR which are also stable in the cathode environment of the PEMFC.

SUMMARY

These and other objects are provided by the embodiments of the present disclosure, the first embodiment of which provides an oxygen reduction reaction (ORR) catalyst, comprising:
a solid catalyst; and
a carbon support;
wherein the solid catalyst comprises platinum metal having a surface complexed with a monodentate thiol ligand comprising an aromatic or heteroaromatic ring containing at least one of a bromide and an iodide substituent. In an aspect of this first embodiment the monodentate thiol ligand comprises an aromatic ring and the aromatic ring is a phenylene group. In another aspect the monodentate thiol ligand is a thiophenol substituted with at least one of a bromide group and an iodide group. In another aspect of the first embodiment the monodentate thiol ligand comprises a heteroaromatic ring and the heteroaromatic ring is a 5 or 6 membered ring containing at least one of N, O and S. Specific examples of heteroaromatic rings of this aspect include one selected from the group consisting of furan, thiophene, pyrrole, pyridine, pyrimidine and pyrazine.

In a further defined aspect of the first embodiment the monodentate thiol ligand is a mercaptopyridine substituted with at least one of a bromide group and an iodide group and in one explicit aspect the monodentate thiol ligand is 5-bromopyridine-2-thiol.

In another aspect of the first embodiment the surface of the Pt metal available for catalyst activity is at least 50% of a total Pt surface area. In another consideration of this aspect the solid catalyst further comprises an alloy metal and the alloy metal is selected from the group consisting of the transition metals. In a special consideration of this aspect the alloy metal is selected from the group consisting of Fe, Co, Ni and Cu and in one particular consideration the alloy metal is Co.

In an aspect of the first embodiment the carbon support comprises a conductive carbon and in a consideration of this aspect the conductive carbon is selected from the group consisting of carbon black, Super P®, Super C65®, Ensaco® black, Ketjen black, acetylene black, synthetic graphite such as Timrex® SFG-6, Timrex® SFG-15, Timrex® SFG-44, Timrex® KS-6, Timrex® KS-15, Timrex® KS-44, natural flake graphite, carbon nanotubes, fullerenes, hard carbon, and mesoporous carbon.

In a second embodiment of this disclosure a membrane electrode assembly for oxygen reduction is provided which comprises: a catalyst layer according the first embodiment in all aspects disposed between an ionomeric membrane and a gas diffusion layer.

In a third embodiment of this disclosure a polymer electrolyte fuel cell comprising the catalyst of the first embodiment or membrane-electrode assembly of the second embodiment is provided.

Additional advantages and other features of the present invention will be set forth in part in the description that follows and in part will become apparent to those having ordinary skill in the art upon examination of the following or may be learned from the practice of the present invention. The advantages of the present invention may be realized and obtained as particularly pointed out in the appended claims.

As will be realized, the present invention is capable of other and different embodiments, and its several details are capable of modifications in various obvious respects, all without departing from the present invention. In this regard, the description herein is to be understood as illustrative in nature, and not as restrictive.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF PREFERRED EMBODIMENTS

The inventors have been conducting studies of various methods to enhance catalytic activity of Pt and Pt metal alloy nanoparticle ORR catalysts. As part of an ongoing investigation the effect and performance of a series of monodentate ligands was investigated. In this work ligands based on carboxyl groups, amine groups and thiol groups were studied for effect on ORR activity.

Figure 7:
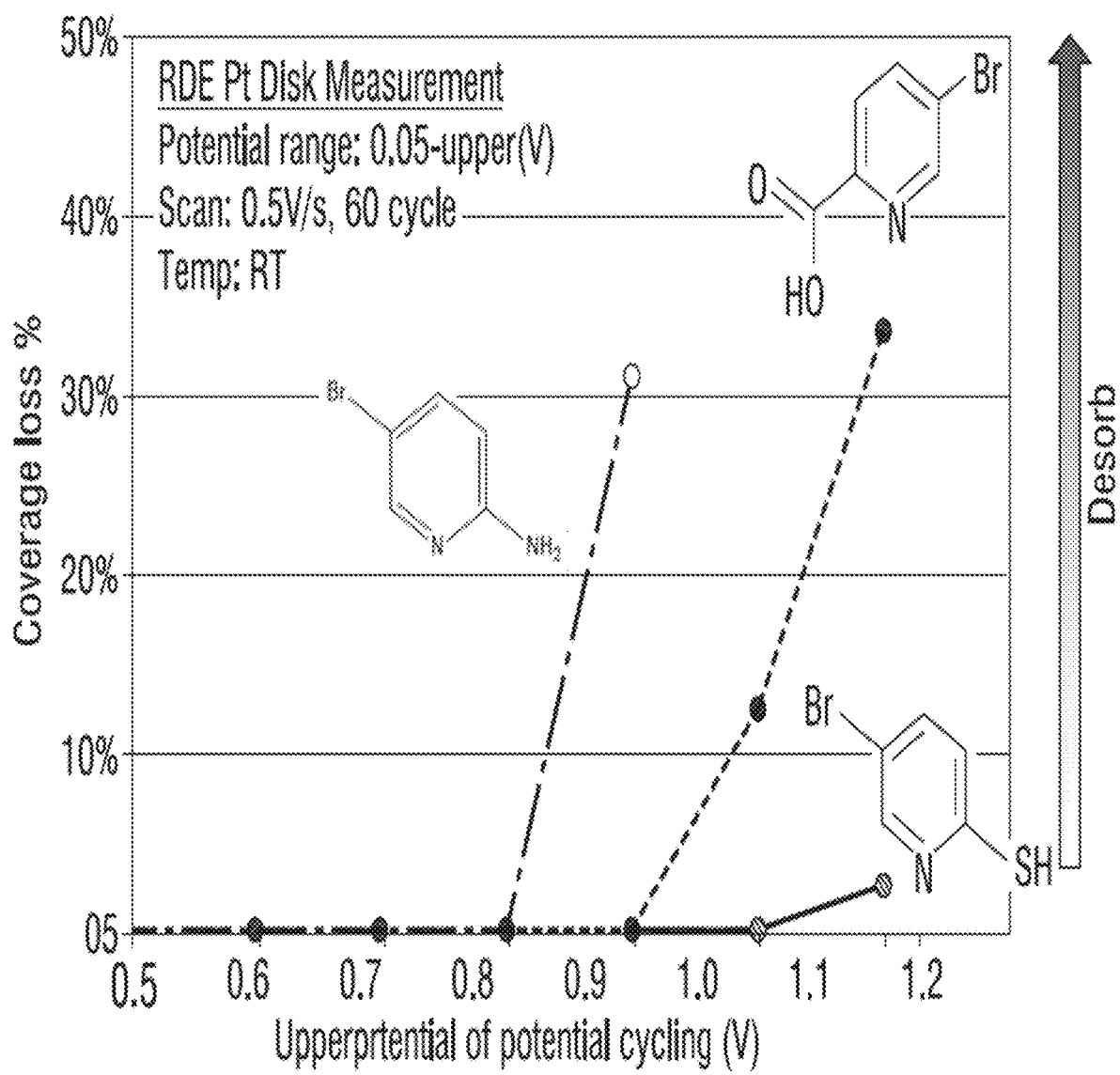
FIG. 7 shows a plot of ligand coverage vs. applied potential for 3 ligands tested.
Figure 8:
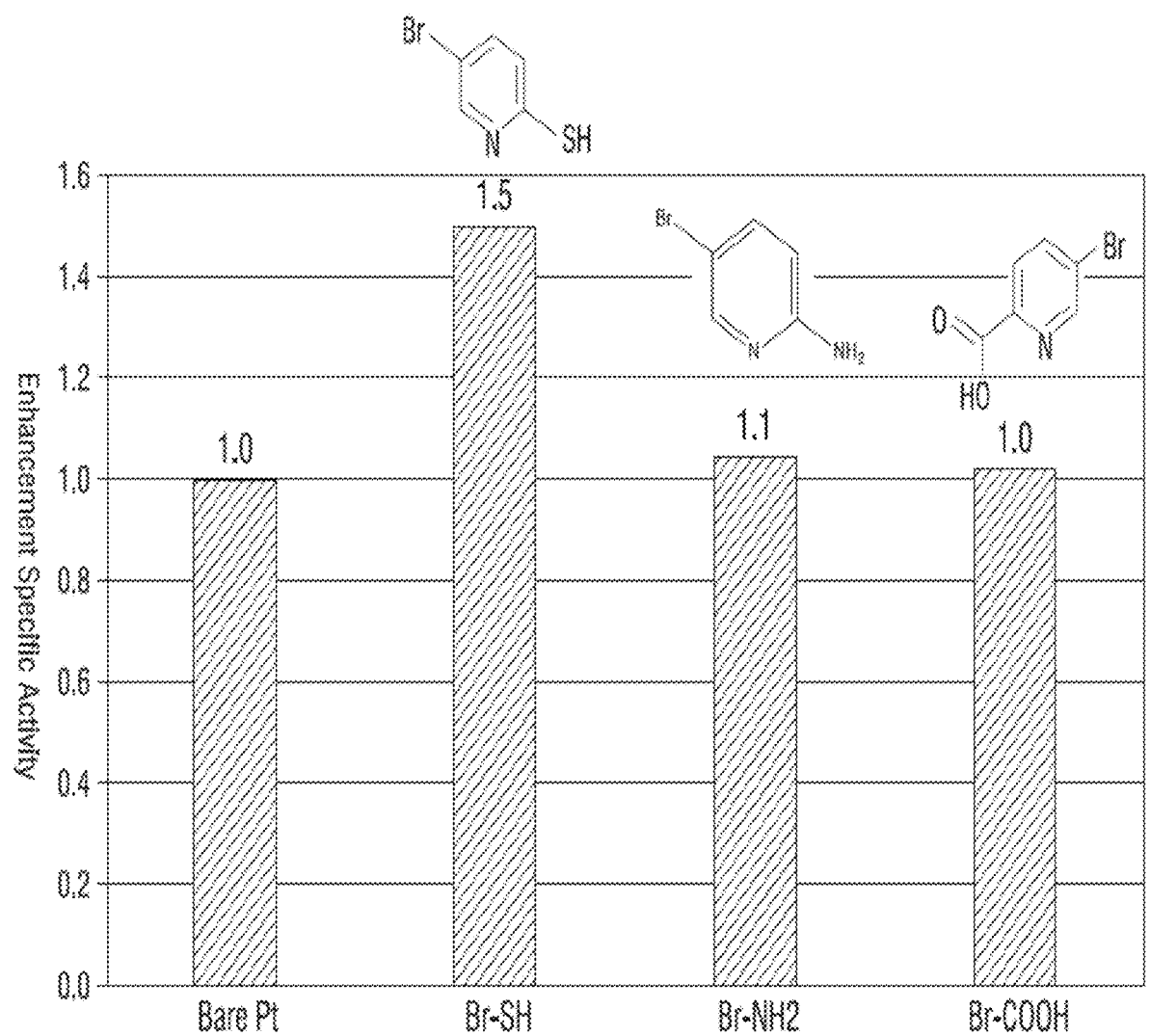
FIG. 8 shows a bar graph of relative ORR activity for 5-bromopyridine-2-carboxylic acid, 2-amino-5-bromopyridine and 5-bromopyridine-2-carboxylic acid.
Figure 9:
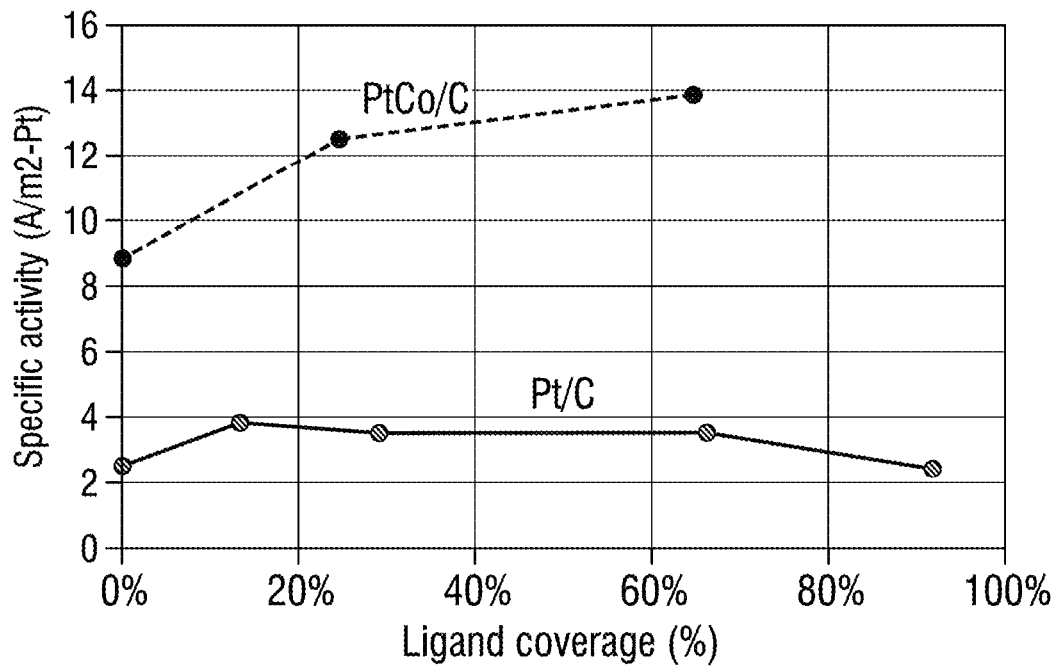
FIG. 9 shows a graph of activity vs. ligand coverage for 2 catalysts according to the present disclosure.

In this work Pt electrode disks were separately treated with ligand solutions of 5-bromopyridine-carboxylic acid, 2-amino-5-bromopyridine and 5-bromopyridine-2-thiol as described in the Examples. The treated electrodes were each then tested for ORR activity relative to an untreated electrode. The relative enhancement in activity obtained is shown in FIG. 8. Unexpectedly, only 5-bromopyridine-2-thiol showed significant increase in activity. In further study to understand this discovered difference a series of cyclic voltammograms at varying potentials were conducted and the results are shown in FIG. 7 where coverage loss relative to applied potential shows that at 0.8 V or higher the amine and carboxyl ligands actually desorb from the catalyst surface. In contrast, the thiol ligand does not desorb significantly even at 1.1 (V). The inventors have noted that conventionally in standard vehicle power units the driving potential is in the range of 0.8 to 1.0 V.

Figure 10:
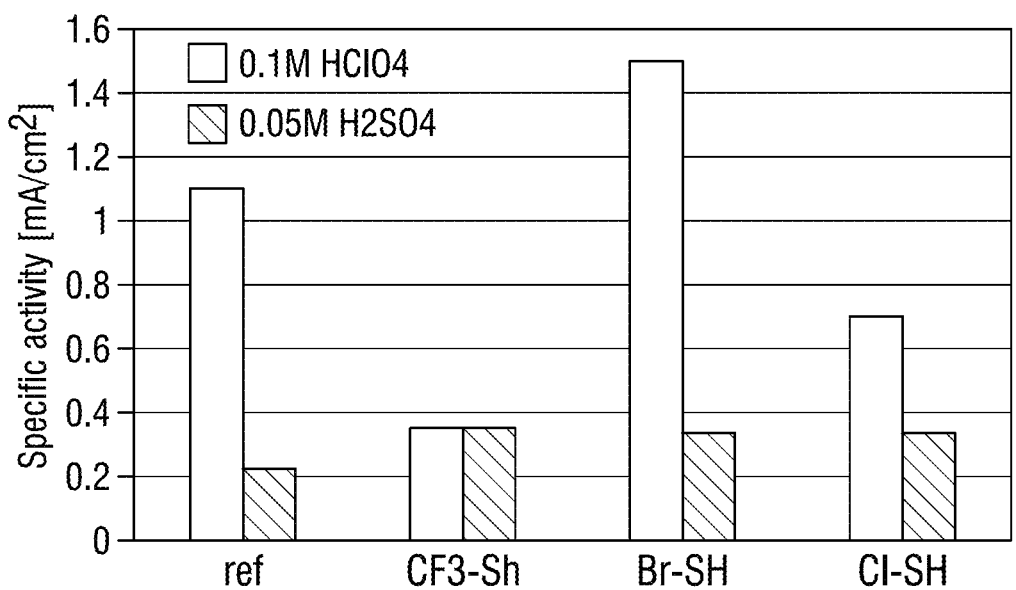
FIG. 10 shows a bar graph of relative specific activity of three ligands systems studied in this disclosure.

Further study was then directed to catalyst ligands based on thiol group bonding with variation of substituent on the ring. In this study catalytic performance of 5-chloropyridine-2-thiol, 5-trifluoromethylpyridine-2-thiol and 5-bromopyridine-2-thiol were compared using the disk electrode method described in the examples. In this study, activity determined in $HClO_4$ and $H_2SO_4$ electrolytes was evaluated as shown in FIG. 10.

It is noted that $HClO_4$ is considered a non-catalyst poisoning electrolyte while sulfate groups present in $H_2SO_4$ electrolyte adsorb to and poison the catalyst active site. This is demonstrated in FIG. 12 where the reference untreated electrode shows significantly greater specific activity in the $HClO_4$ electrolyte. In comparison, treatment with trifluoromethyl ligand and chloro substituted ligand show reduced activity in comparison to the reference in $HClO_4$ but increased activity in $H_2SO_4$. Surprisingly, the bromo-substituted ligand provided a significant increase in activity (36%) in $HClO_4$ over the reference and an activity similar to trifluoromethyl ligand and chloro substituted ligands in $H_2SO_4$.

Figure 11:
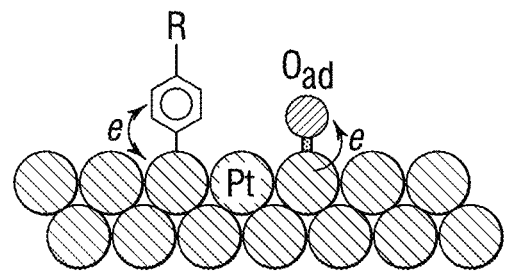
FIG. 11 shows a schematic diagram of change in surface electronegativity.
Figure 12:
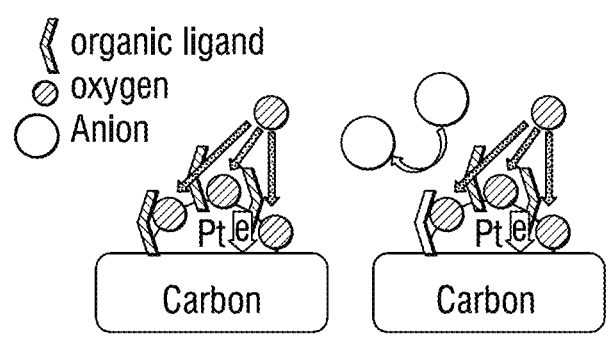
FIG. 12 shows a schematic diagram of blockage of anion adsorption on the catalyst surface.

To understand this effect the inventors conducted a series of experiments to evaluate the degree of ligand coverage of active sites on the catalyst surface. The effect of the ligand was considered to be based upon a change in electron density on the Pt surface as depicted in FIG. 11 or a blocking effect of anion poisons such as sulfate groups of the ionomer membrane as depicted in FIG. 12. Therefore, the degree of ligand coverage of the catalyst surface was investigated based upon determination of the electrochemical surface area (ECSA) of the ligand treated catalysts.

Ligand Coverage={[ECSA(Pt)−ECSA(modified Pt)]/ECSA(Pt)}×100(%)

Figure 13:
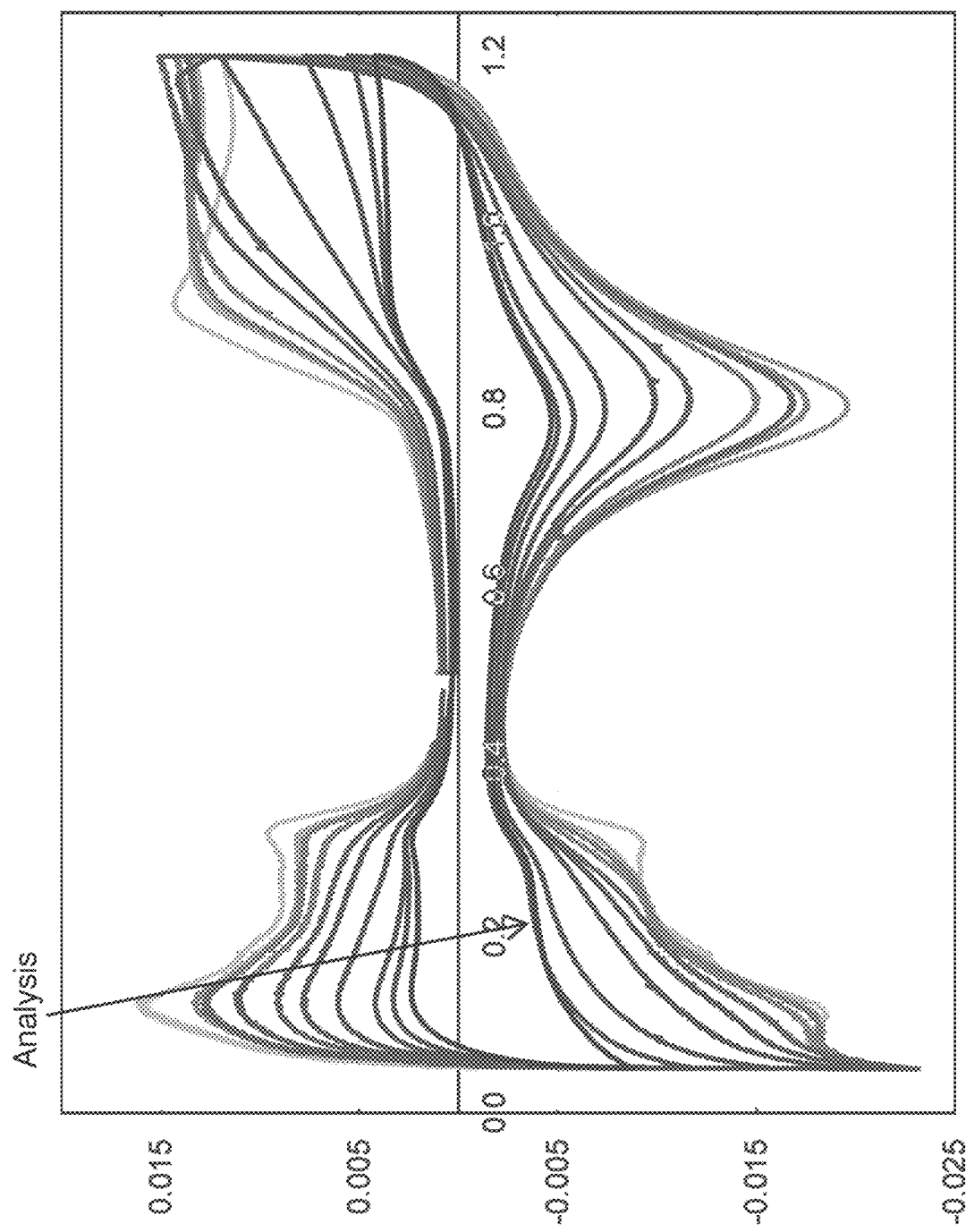
FIG. 13 show a CV study of 5-trifluormethylpyridine-2-thiol with ligand concentration.
Figure 14:
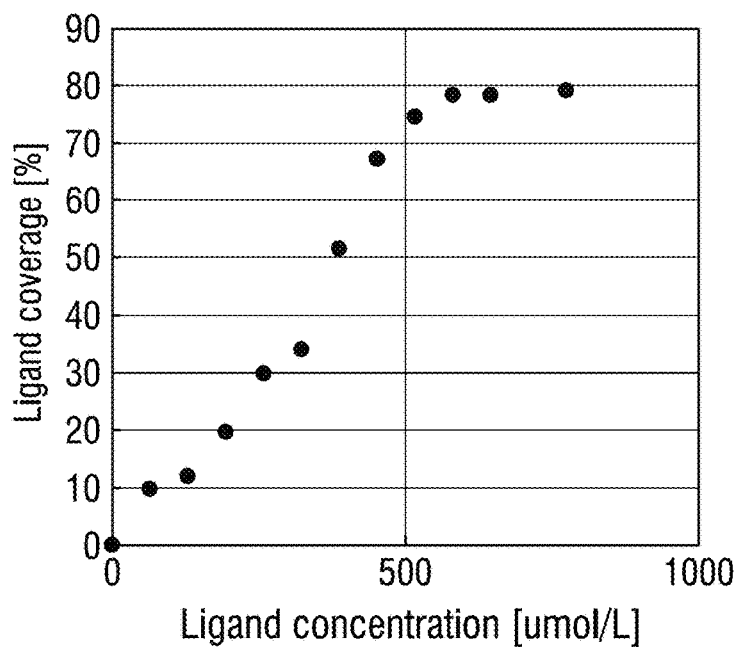
FIG. 14 is a graph showing the correlation between ligand solution concentration and amount of ligand applied to the catalyst surface.
Figure 15:
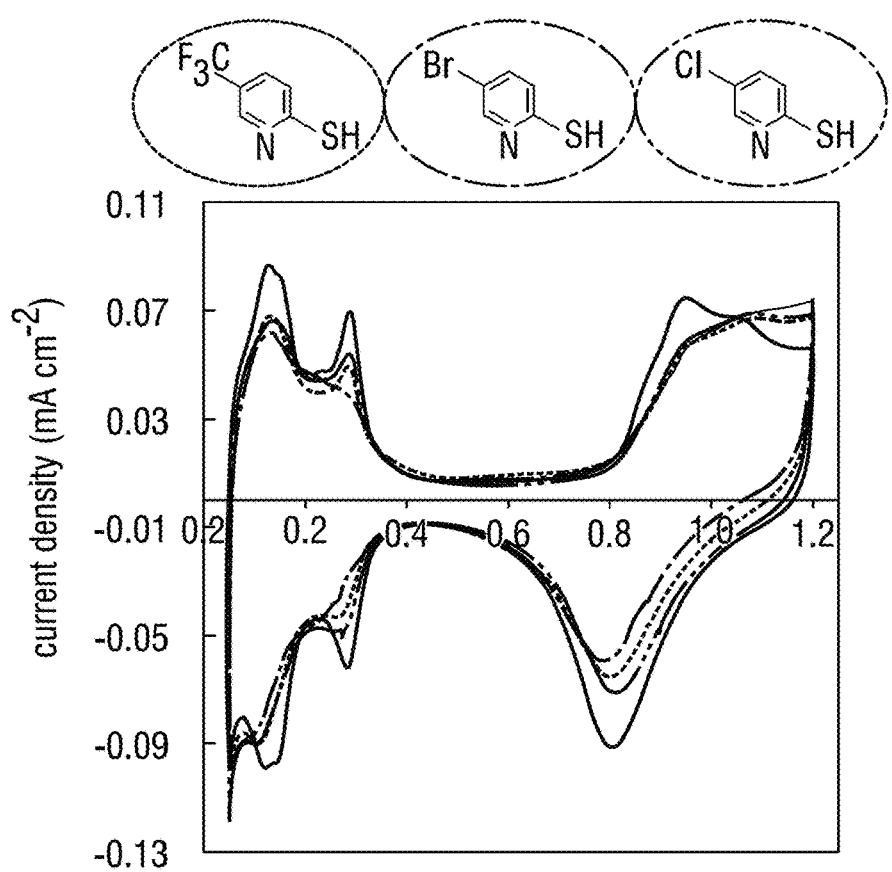
FIG. 15 shows the CV curve for 5-chloropyridine-2-thiol, 5-trifluoromethylpyridine-2-thiol and 5-bromopyridine-2-thiol relative to an untreated catalyst.
Figure 16:
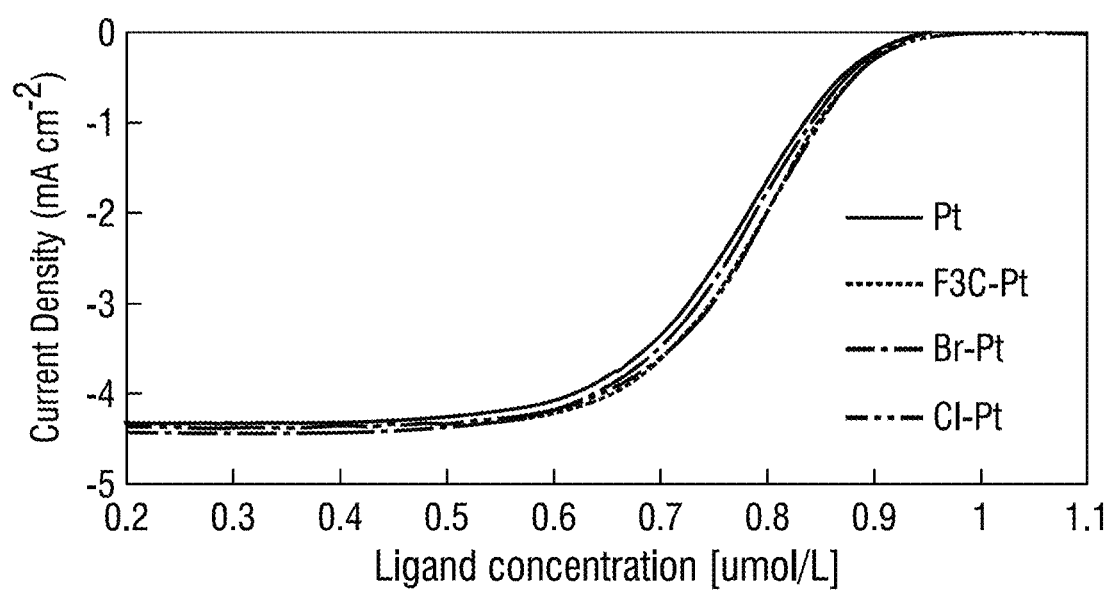
FIG. 16 shows the polarization curves for the catalysts shown in FIG. 16.

ECSA is determined by evaluation of the effect of ligand concentration in a series of cyclic voltammetry (CV) runs on the CV curve shape. One example of the CV curve analysis is shown in FIG. 13 for 5-trifluoromethylpyridine-2-thiol. The inventors have learned that the amount of ligand bonded to the catalyst surface is directly related to the concentration of the ligand solution applied to the electrode in the method described in the Example. This linear relationship is shown in FIG. 14. Analysis of the change in area of the CV curve with increasing amount of ligand applied determines the ECSA for the catalyst. The general CV curves for 5-chloropyridine-2-thiol, 5-trifluoromethylpyridine-2-thiol and 5-bromopyridine-2-thiol are shown in FIG. 15. Polarization curves for these electrodes are shown in FIG. 16.

From this analysis, the inventors determined the coverage of the ligands as follows:

| Ligand | Coverage |
| --- | --- |
| 5-trifluoromethylpyridine-2-thiol (F$_3$C—Pt) | 19% |
| 5-bromopyridine-2-thiol (Br—Pt) | 26% |
| 5-chloropyridine-2-thiol (Cl—Pt) | 15% |

Figure 17:
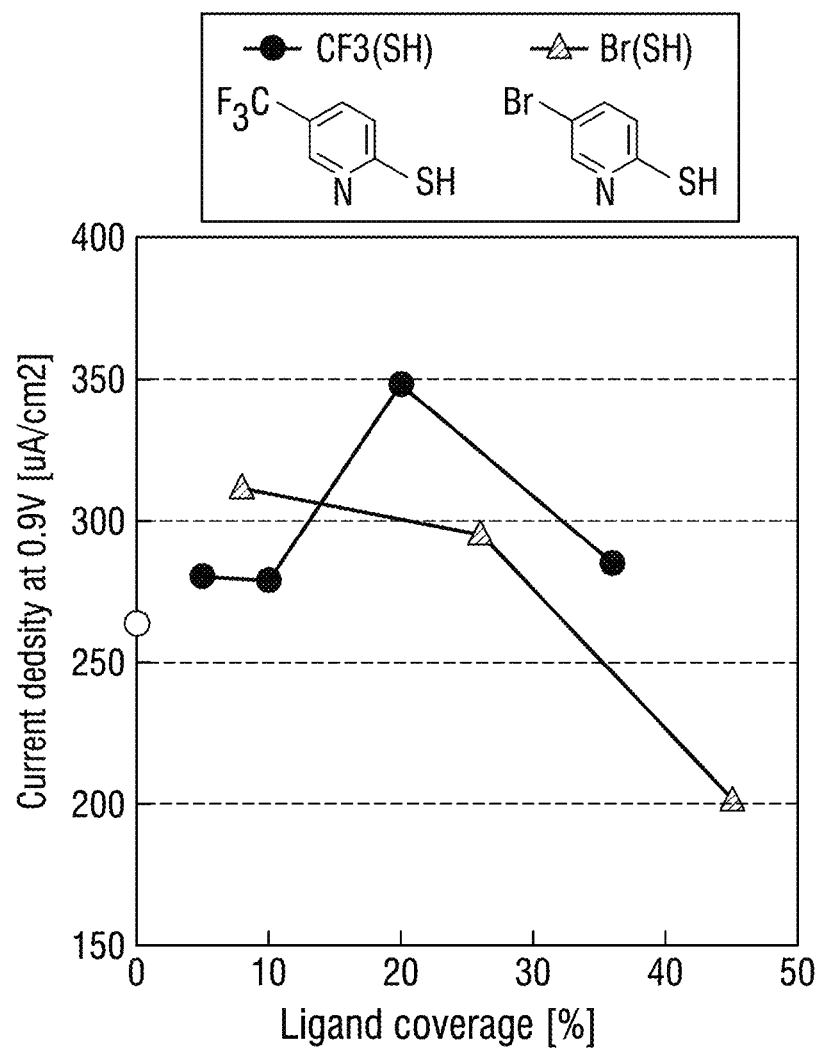
FIG. 17 shows a graph of total activity vs. ligand coverage for 5-trifluoromethylpyridine-2-thiol and 5-bromopyridine-2-thiol.
Figure 18:
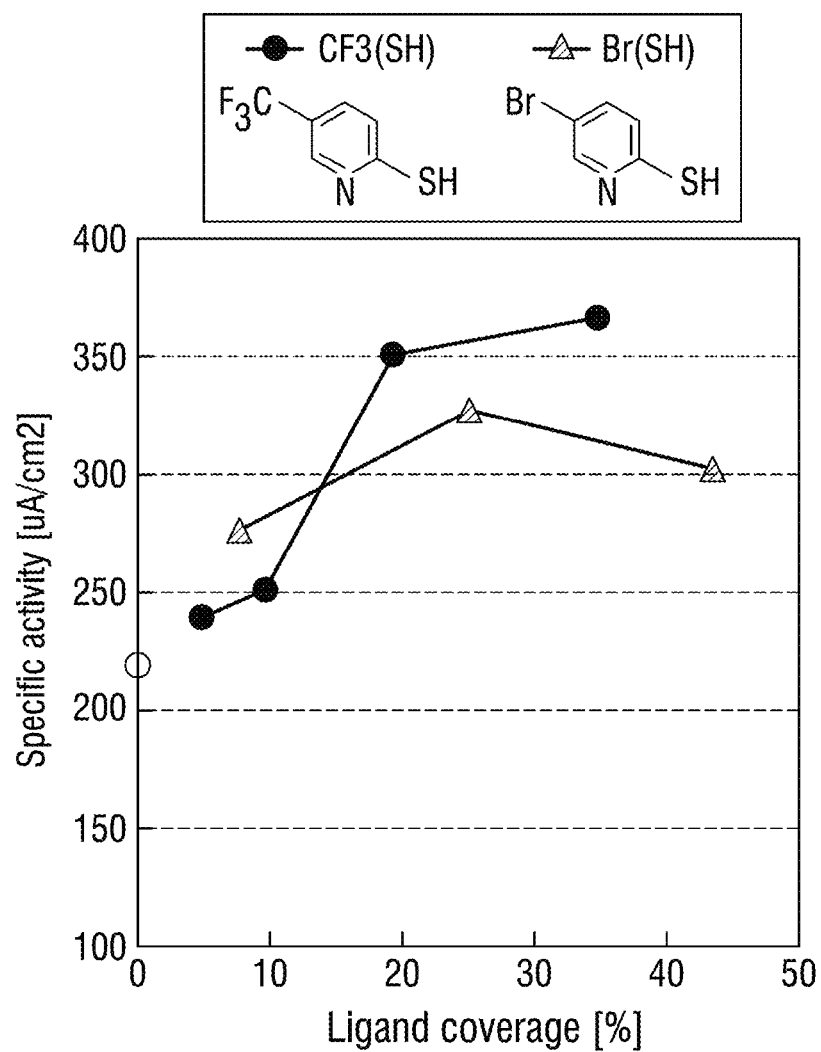
FIG. 18 shows a graph of specific activity vs. ligand coverage for 5-trifluoromethylpyridine-2-thiol and 5-bromopyridine-2-thiol.

The effect of ligand coverage on ORR activity was then studied for 5-trifluoromethylpyridine-2-thiol and 5-bromopyridine-2-thiol. The total activity is shown in FIG. 17 and the specific activity is shown in FIG. 18. The data shown in the curves shows that there is an optimum range of ligand coverage in order to obtain maximum ORR catalyst activity. The range of coverage is considered to be from 10 to 50% based the specific activity.

Figure 6:
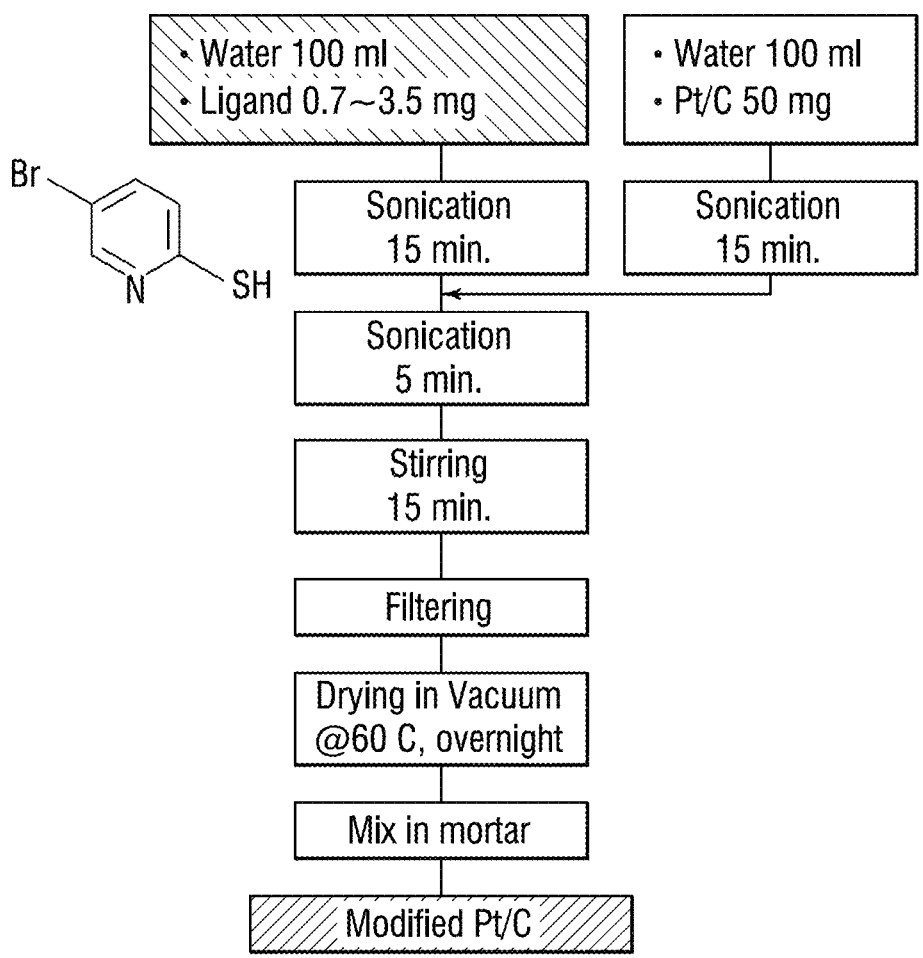
FIG. 6 shows a method flow diagram to modify the surface of a Pt powder according to an aspect of the present disclosure.
Figure 19:
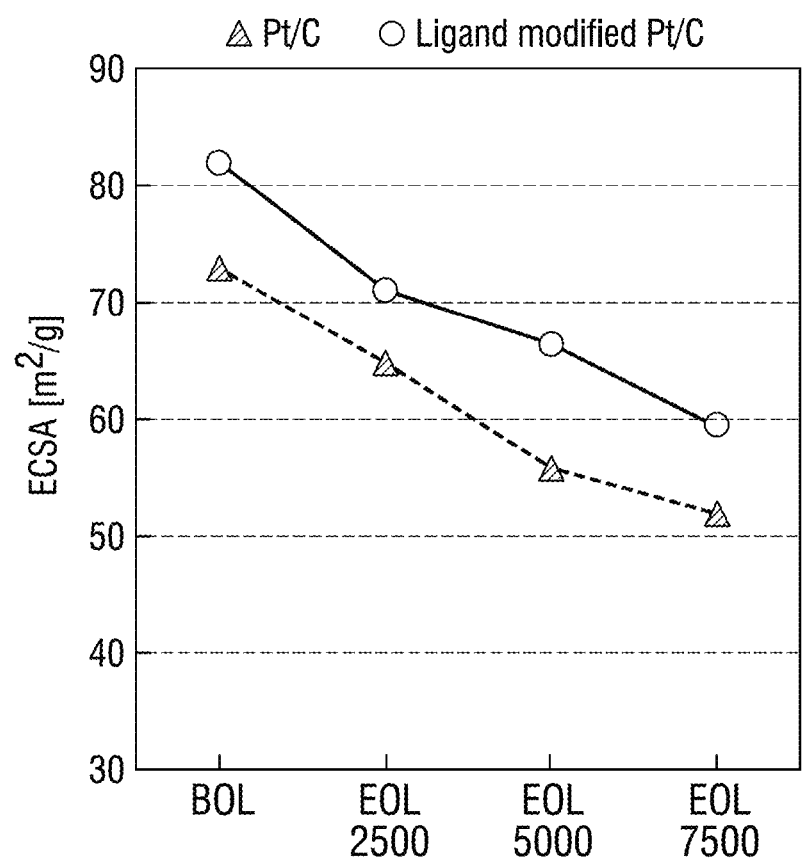
FIG. 19 shows a graph of ECSA change with acceleration cycle testing for a catalyst modified with 5-bromopyridine-2-thiol.
Figure 20:
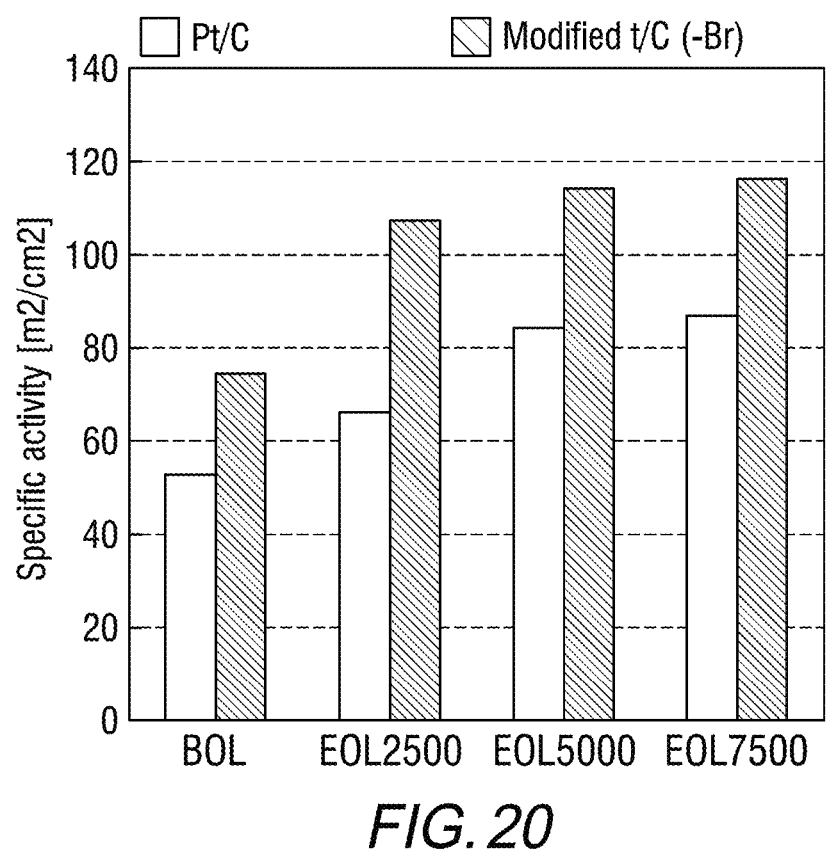
FIG. 20 shows the change is specific activity with acceleration cycle testing for a catalyst modified with 5-bromopyridine-2-thiol.

From this study, 5-bromopyridine-2-thiol was further studied for performance on a carbon supported Pt nanoparticle catalyst powder. The ligand was applied as described in the Example and shown in FIG. 6. The catalyst was then cycled through a series of acceleration cycle testing from 0.6 to approximately 1.0 V in 0.05 M H$_2$SO$_4$ up to 7500 cycles. The change in ECSA is shown in FIG. 19 and the change in specific activity is graphed in FIG. 20. As indicated in FIG. 19 the difference in ESCA remains virtually the same after 7500 cycles showing the stability of the ligand coverage with 5-bromopyridine-2-thiol. Further, as shown in FIG. 20 the increased activity due to the ligand treatment with 5-bromopyridine-2-thiol remained substantially the same (35% vs 40%).

Figure 21:
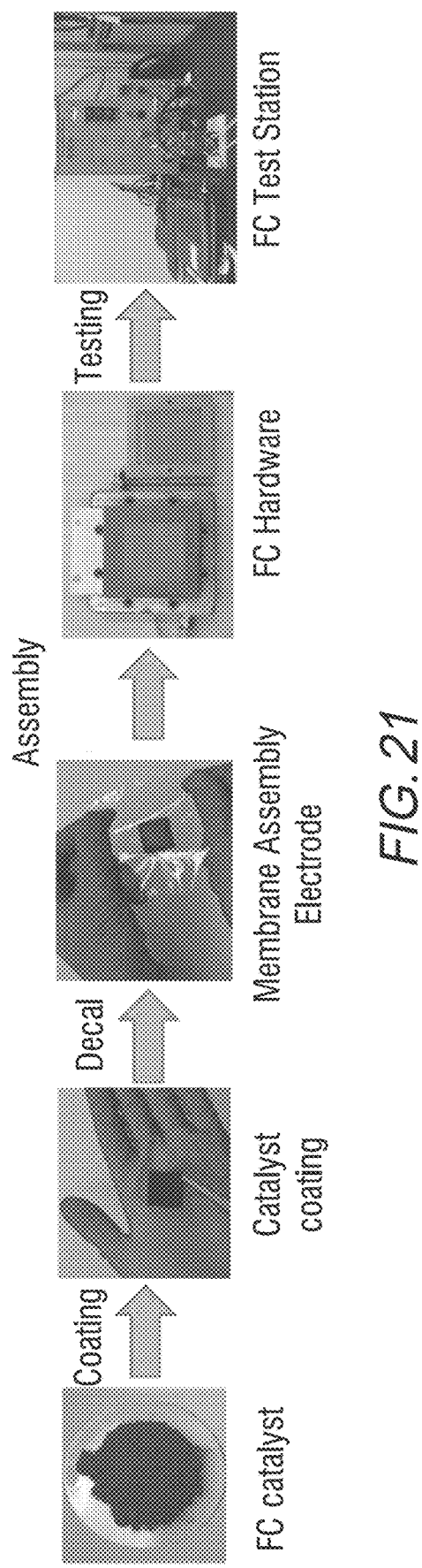
FIG. 21 shows preparation of a test fuel cell.
Figure 22:
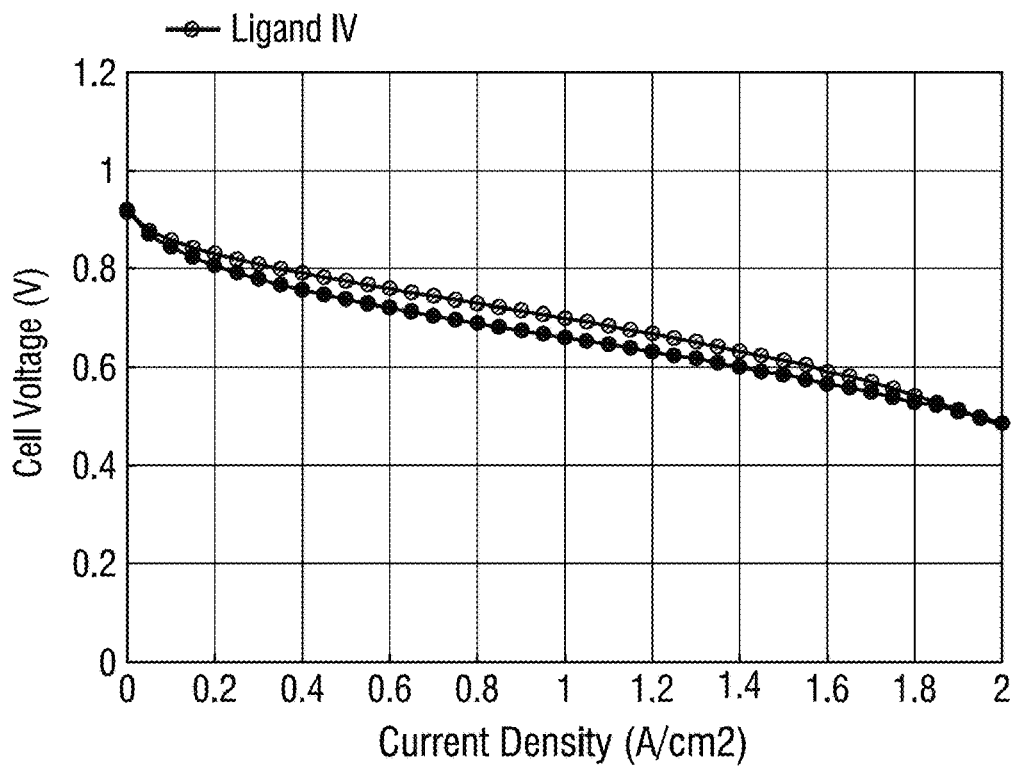
FIG. 22 shows the I-V curve for a fuel cell having a modified catalyst according to the present disclosure in comparison to an unmodified catalyst.

The 5-bromopyridine-2-thiol ligand treated catalyst was then constructed into a fuel cell as described in the Example and shown in FIG. 21. The I-V testing results of the cell relative to a cell prepared in the same method using an untreated catalyst is shown in FIG. 22 and as shown at low current density the treated catalyst is more effective.

To further study the effect and mechanism of the ligand modification, CO stripping and CO displacement analyses were performed. According to the Langmuir-Hinshelwood method of CO stripping the catalyst surface is flushed with CO and OH species adsorbed on the catalyst surface is removed according to the following equation.

CO$_{ad}$+OH$_{ad}$→CO$_2$+H$^+$+e$^-$

Figure 23:
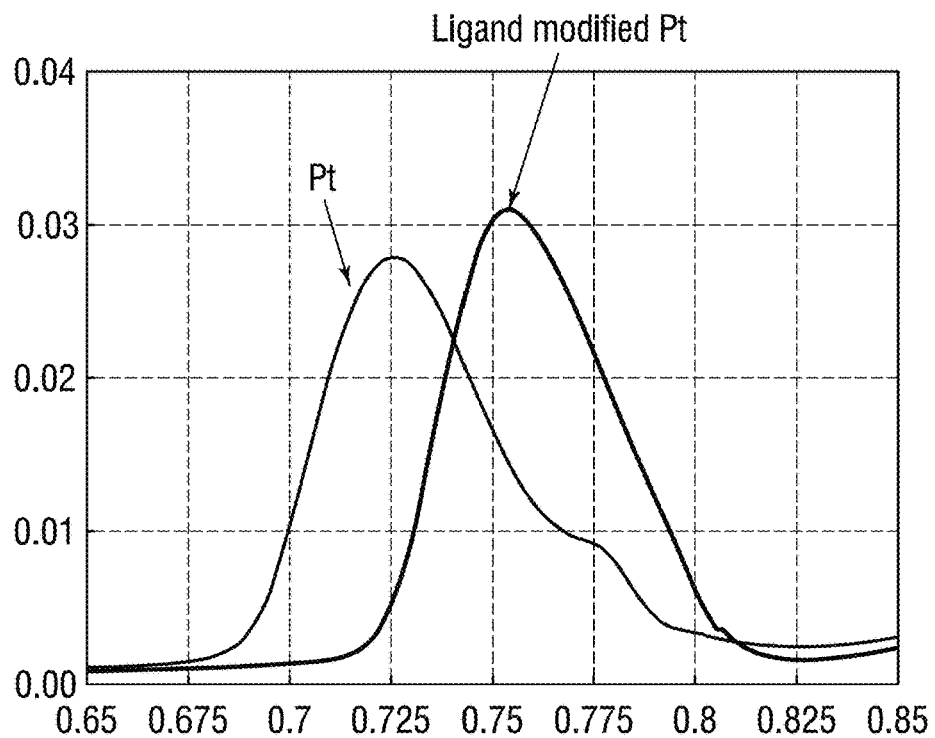
FIG. 23 shows the effect of CO stripping experiment.

The effect of CO stripping is shown in FIG. 23. As indicated the presence of the 5-bromopyridine-2-thiol ligand delays the formation of —OH adsorption on the Pt surface and therefore, more active sites are available to promote ORR.

The CO displacement study as described by T. Garrick et al. (J. Electrochem. Soc., 2017, 164, F60) is characterized by the following formula.

Pt-A+CO+e$^-$→Pt—CO+A$^-$

Figure 24:
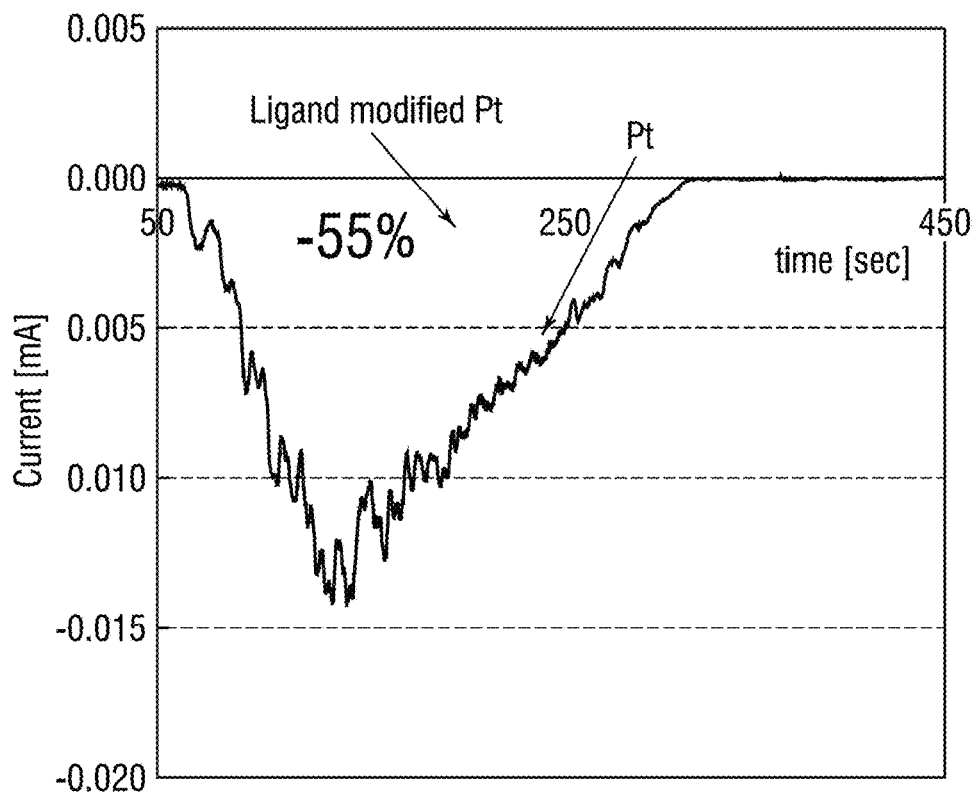
FIG. 24 shows the results of the CO displacement test.

The result of the test is shown in FIG. 24. This analysis again shows that the presence of the 5-bromopyridine-2-thiol ligand reduces anion adsorption to the catalyst surface and therefore, more active sites are available to promote the ORR.

In consideration of all the described testing, the inventors believe, but do not wish to be limited to this theory, that specific ligands having a thiol binding group, and an aromatic ring substituted with bromide or iodide enhance catalyst activity by a combination of a surface electronegativity effect and steric surface protection as diagrammed in FIGS. 11 and 12.

Figure 25:
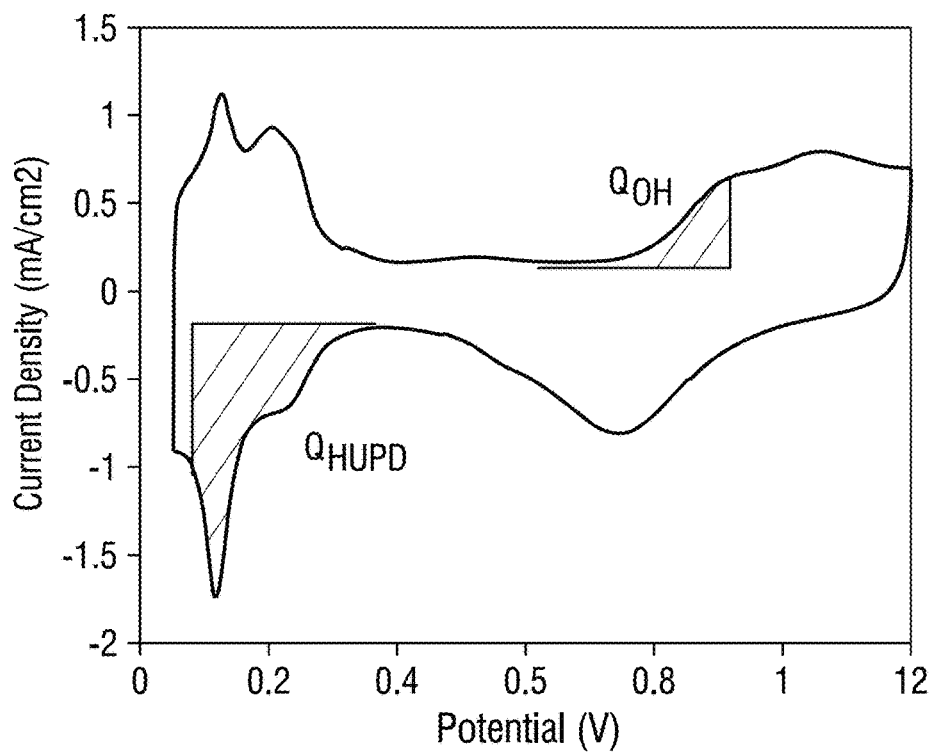
FIG. 25 shows the calculation of θ from a CV curve.
Figure 26:
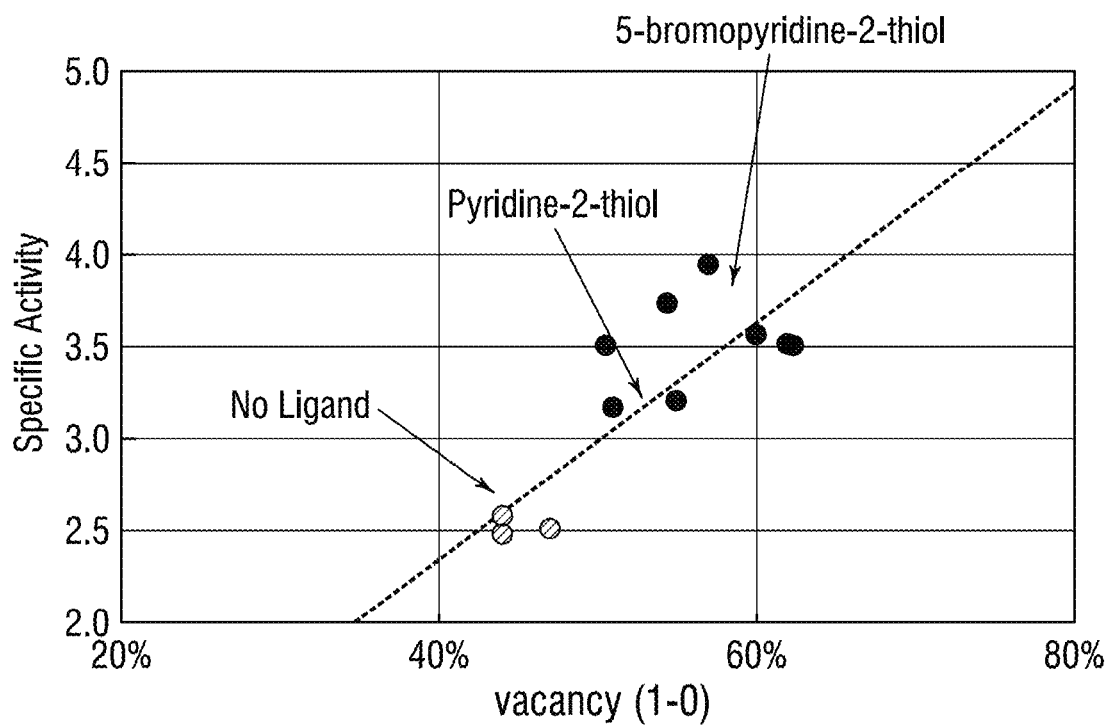
FIG. 26 shows a plot of specific activity vs. a vacancy value (1−θ) for one study of the disclosure.

The activity of a catalyst in the ORR is defined according to the following equation'

$$i = nFK[O_2](1-\theta)\exp\left(\frac{-\beta FE}{RT}\right)\exp\left(\frac{-\omega\theta}{RT}\right)$$

where n is number of electron transferred, F is faraday constant, K is a chemical rate constant, (1−θ) is the available surface or active site vacancy, β is a symmetry factor, E is the applied potential, and ω is the energy parameter for the Temkin isotherm. Thus, according to this equation current density is proportional to active site vacancy (1−θ). θ is calculated from the ratio of Q values of the CV curve as shown in FIG. 25. FIG. 26 shows an analysis of the value of (1−θ) and specific activity and demonstrates that engineering of the catalyst interface to a specific range of (1−θ) provides a method to optimize ORR activity.

Figure 27:
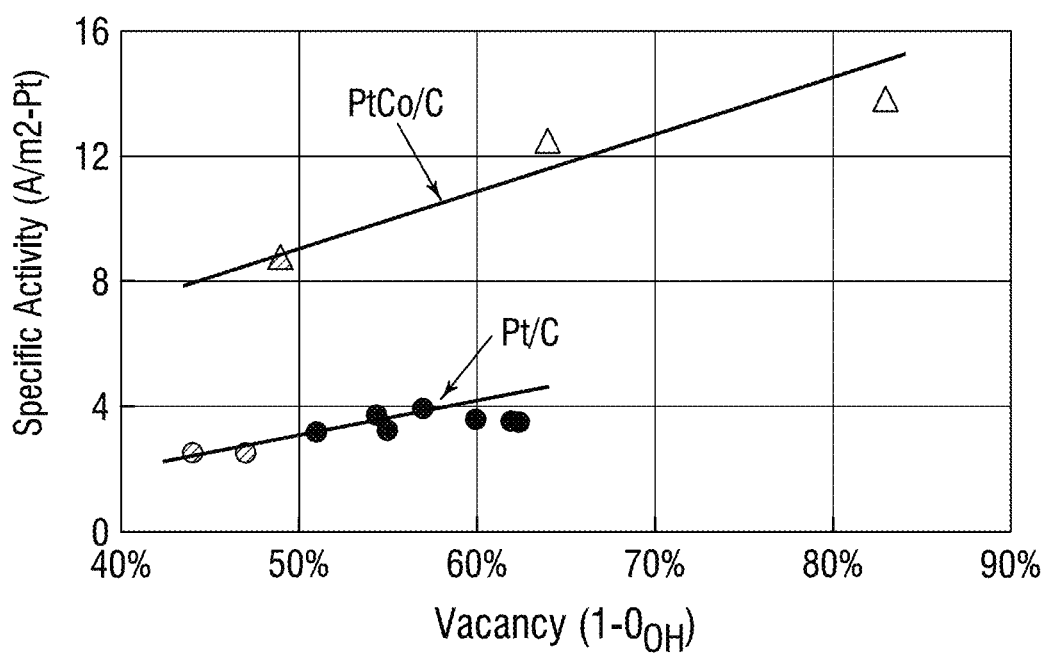
FIG. 27 shows the Coverage-Activity relationship for a Pt catalyst and a PtCo catalyst.
Figure 28:
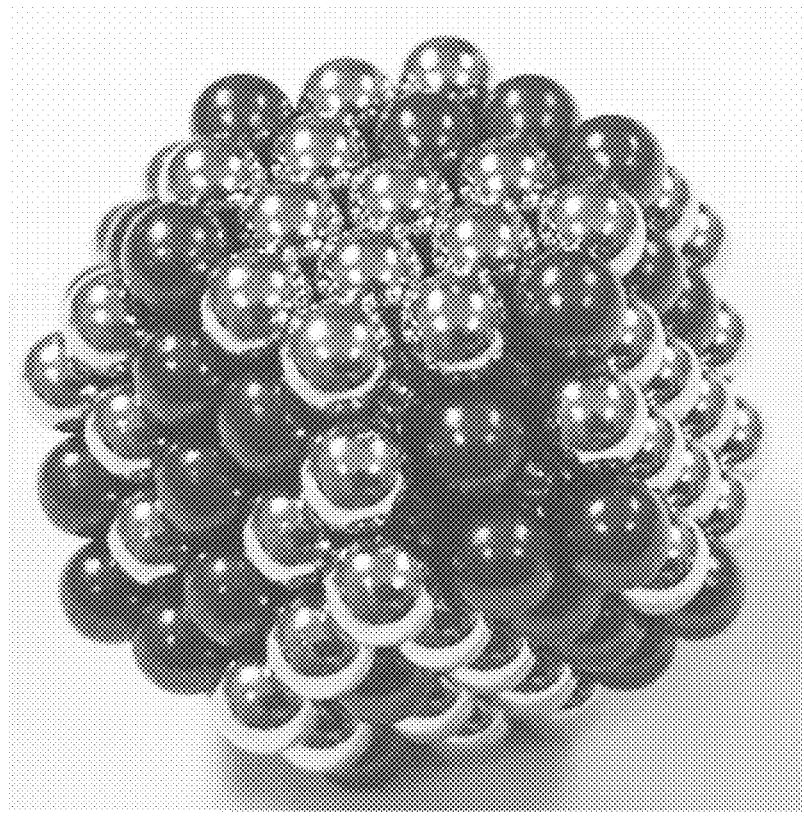
FIG. 28 shows a model of a Pt alloy catalyst.

Surface modification of Pt alloy nanoparticle catalysts was also studied. Pt alloys of transition metals, including but not limited to Fe, Co, Ni and Cu, are of great interest because the alloys may show greater ORR activity than pure Pt. One study of surface modification of a PtCo/C catalyst is shown in FIG. 27 where the Pt/C line shows the same data as shown in FIG. 26. The significant greater specific activity obtained with the alloy catalyst makes such materials of great interest as ORR catalysts. One model of a Pt alloy catalyst structure is shown in FIG. 28; however, the inventors believe that in fact in the Pt alloy structure there is a surface skin of approximately 1-3 Pt monolayers which are surface modified by ligand treatment in a manner similar to the description for the pure Pt catalyst. Although not wishing to be bound by theory it is believed that the ligand bonds only to the Pt and that the significant increase in activity obtained with the Pt alloys is due to an electronic effect of the catalyst on the Pt skin.

Thus, in a first embodiment an oxygen reduction reaction (ORR) catalyst is provided. The catalyst comprises a solid catalyst; and a carbon support wherein the solid catalyst comprises platinum metal or a platinum alloy metal having a surface complexed with a monodentate thiol ligand comprising an aromatic or heteroaromatic ring containing at least one of a bromide and an iodide substituent.

In the catalyst the Pt may be of any morphology useful for catalyst purposes, for example, nanoframes or shape controlled nanocrystals.

The aromatic or heteroaromatic ring of the monodentate thiol ligand may be any of a five or six membered ring structure and may be for example, a phenyl ring or any of five and six membered heterocyclic rings containing at least one of N, O and S. For example but not limiting, the heterocyclic ring may be one selected from the group consisting of furan, thiophene, pyrrole, pyridine, pyrimidine and pyrazine. In one important embodiment of this disclosure, the monodentate thiol ligand may be based on pyridine.

The substituent on the ring of the monodentate thiol ligand is at least one of bromide and iodide. All the various positional isomers available relative to the orientation of the thiol group and the bromide or iodide are included. In an aspect of the embodiment the thiol group and the bromide or iodide substituent are not on adjacent positions of the aromatic or heteroaromatic ring.

In one embodiment the ligand is 5-bromopyridine-2-thiol. In another embodiment, the thiol ligand is 5-iodopyridine-2-thiol.

When the catalyst is a Pt alloy, the alloy metal may be any of transition metals. In special embodiments, the transition metal may be at least one of Fe, Co, Ni and Cu and in one important embodiment the transition metal is Co.

The carbon support may be any conductive carbon useful as a support structure and may be selected from carbon black, Super P®, Super C65®, Ensaco® black, Ketjen black, acetylene black, synthetic graphite such as Timrex® SFG-6, Timrex® SFG-15, Timrex® SFG-44, Timrex® KS-6, Timrex® KS-15, Timrex® KS-44, natural flake graphite, carbon nanotubes, fullerenes, hard carbon, and mesoporous carbon.

Preparation of Pt or Pt alloy nanoparticles supported on a conductive carbon is conventionally known and the catalysts used for surface modification as described herein may be made by any of such methods. These catalysts may then be treated as described in the methods described in the Examples.

In a second embodiment, the present disclosure provides a membrane-electrode assembly (MEA) for a polymer electrolyte fuel cell, comprising a solid catalyst layer of the ORR catalyst according to the embodiments and aspects described herein. The structure of the MEA may be any conventionally known assembly having the catalyst layer in contact with an ionomeric membrane as electrolyte on one side and a gas diffuser on the opposite side. The ionomeric membrane may be any membrane suitable as an electrolyte for transport for hydrogen ions. The gas-diffuser may generally be a porous carbon paper or porous carbon cloth which has been hydrophobized to allow passage of oxygen or air to the catalyst.

Figure 1:
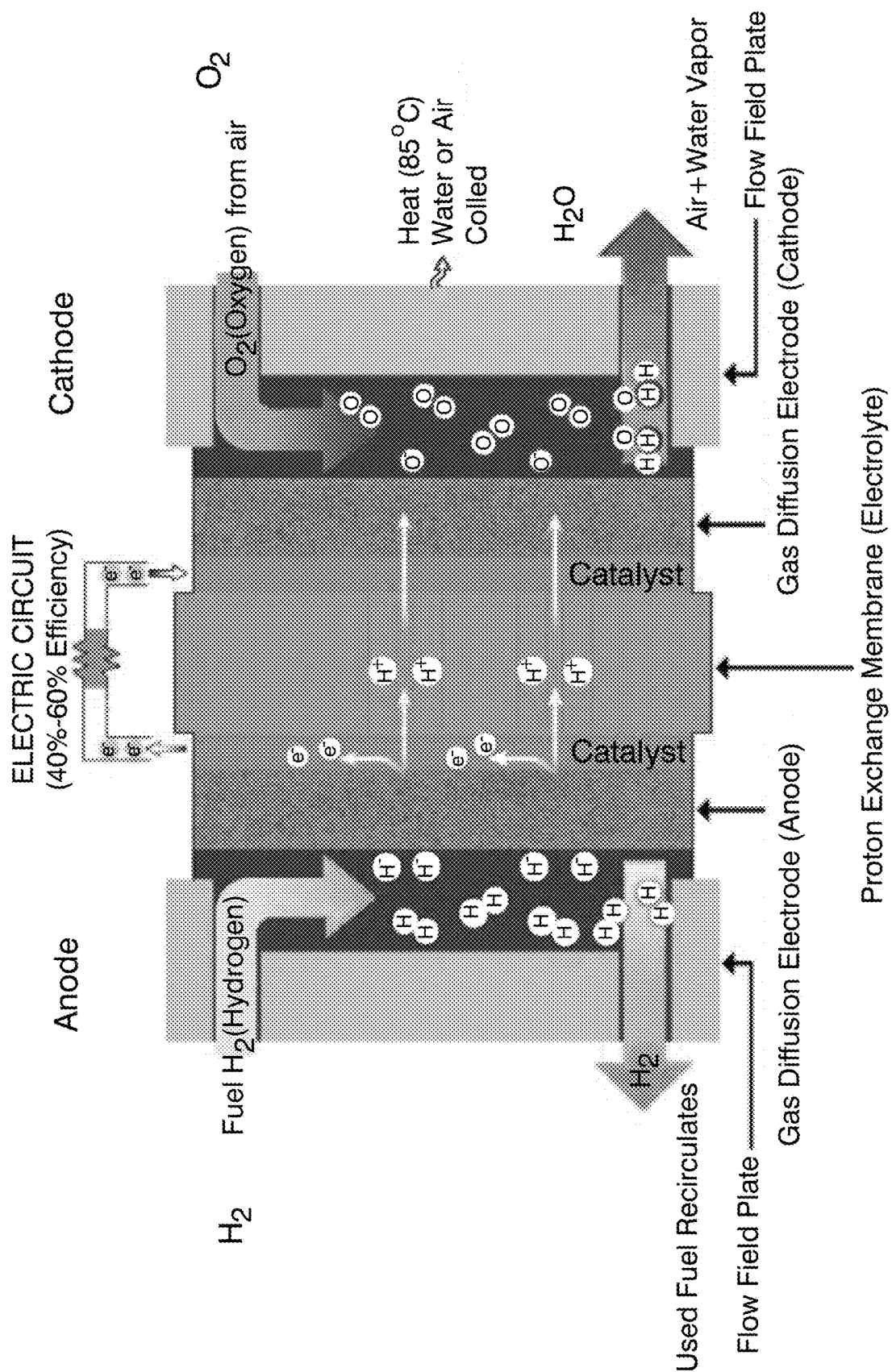
FIG. 1 is a schematic drawing of a polymer electrolyte membrane fuel cell (PEMFC).
Figure 2:
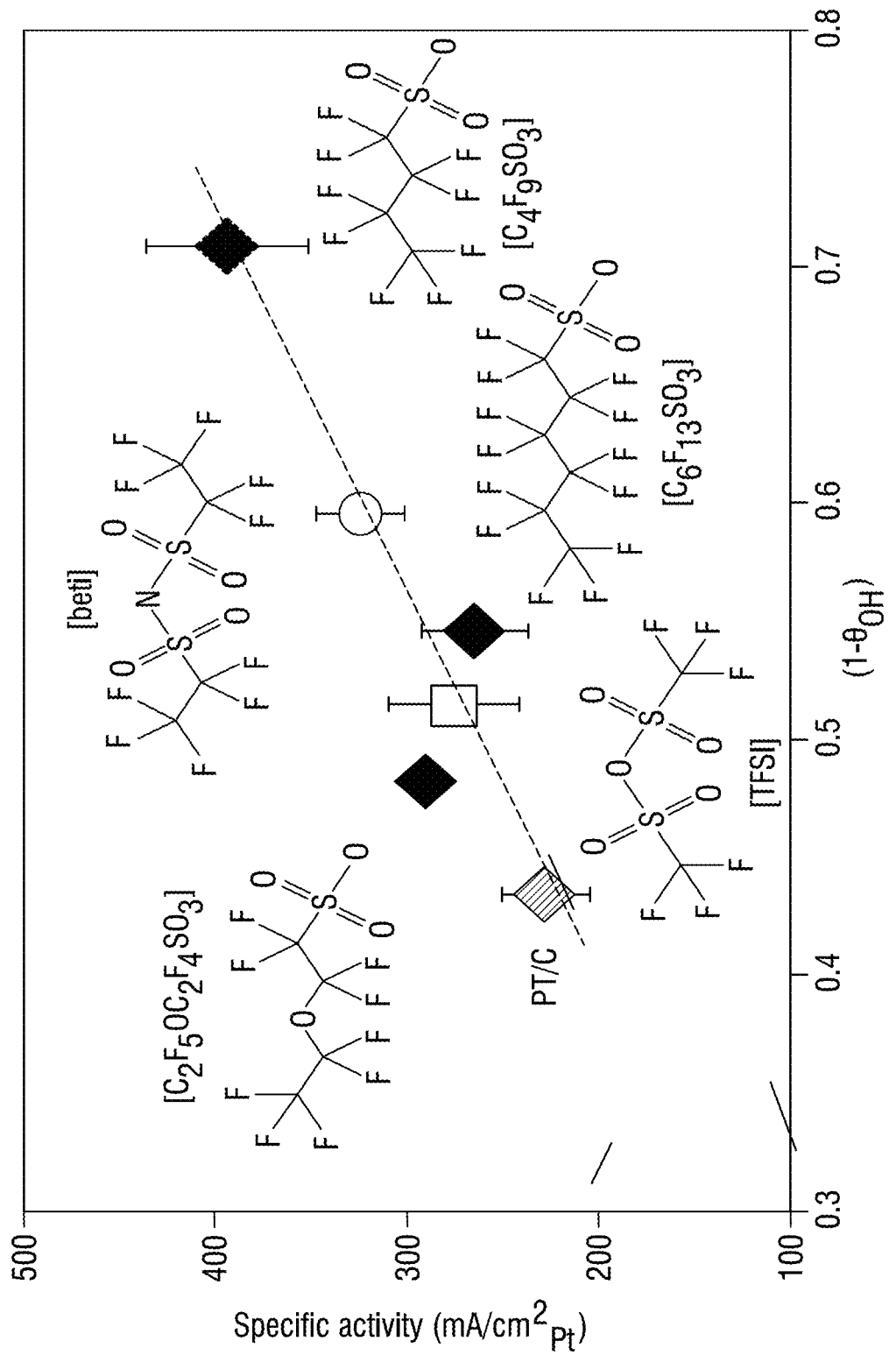
FIG. 2 shows a further depiction of prior art treatment with an ionic liquid.
Figure 3:
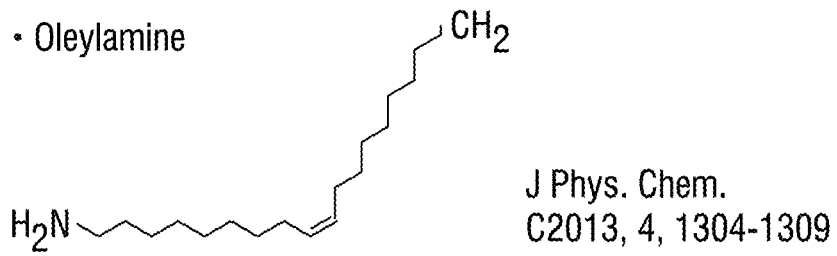
FIG. 3 shows a depiction of prior art amine ligands.
Figure 3:
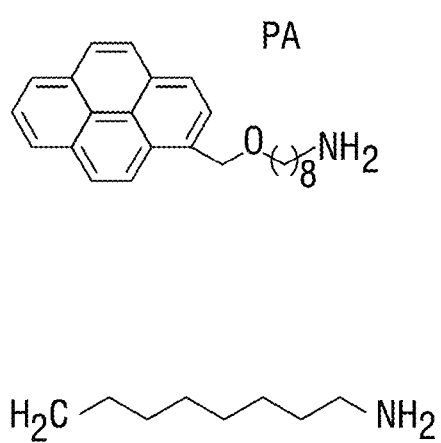
Figure 3:
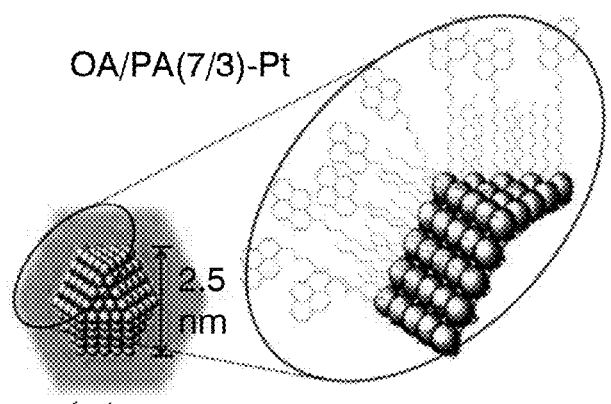
Figure 4:
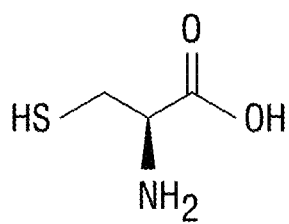
FIG. 4 shows a prior art depiction of thiol ligands.
Figure 4:
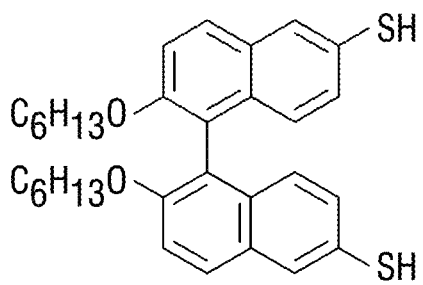

In a third embodiment, the present disclosure provides a polymer electrolyte membrane fuel cell (PEMFC) containing the surface modified catalyst or the MEA described above. The PEMFC may be of any structure conventionally known and one schematic diagram showing the components of a PEMFC is shown in FIG. 1.

The above description is presented to enable a person skilled in the art to make and use the embodiments and aspects of the disclosure, and is provided in the context of a particular application and its requirements. Various modifications to the preferred embodiments will be readily apparent to those skilled in the art, and the generic principles defined herein may be applied to other embodiments and applications without departing from the spirit and scope of the disclosure. Thus, this disclosure is not intended to be limited to the embodiments shown, but is to be accorded the widest scope consistent with the principles and features disclosed herein. In this regard, certain embodiments within the disclosure may not show every benefit of the disclosure, considered broadly.

EXAMPLES

Figure 5:
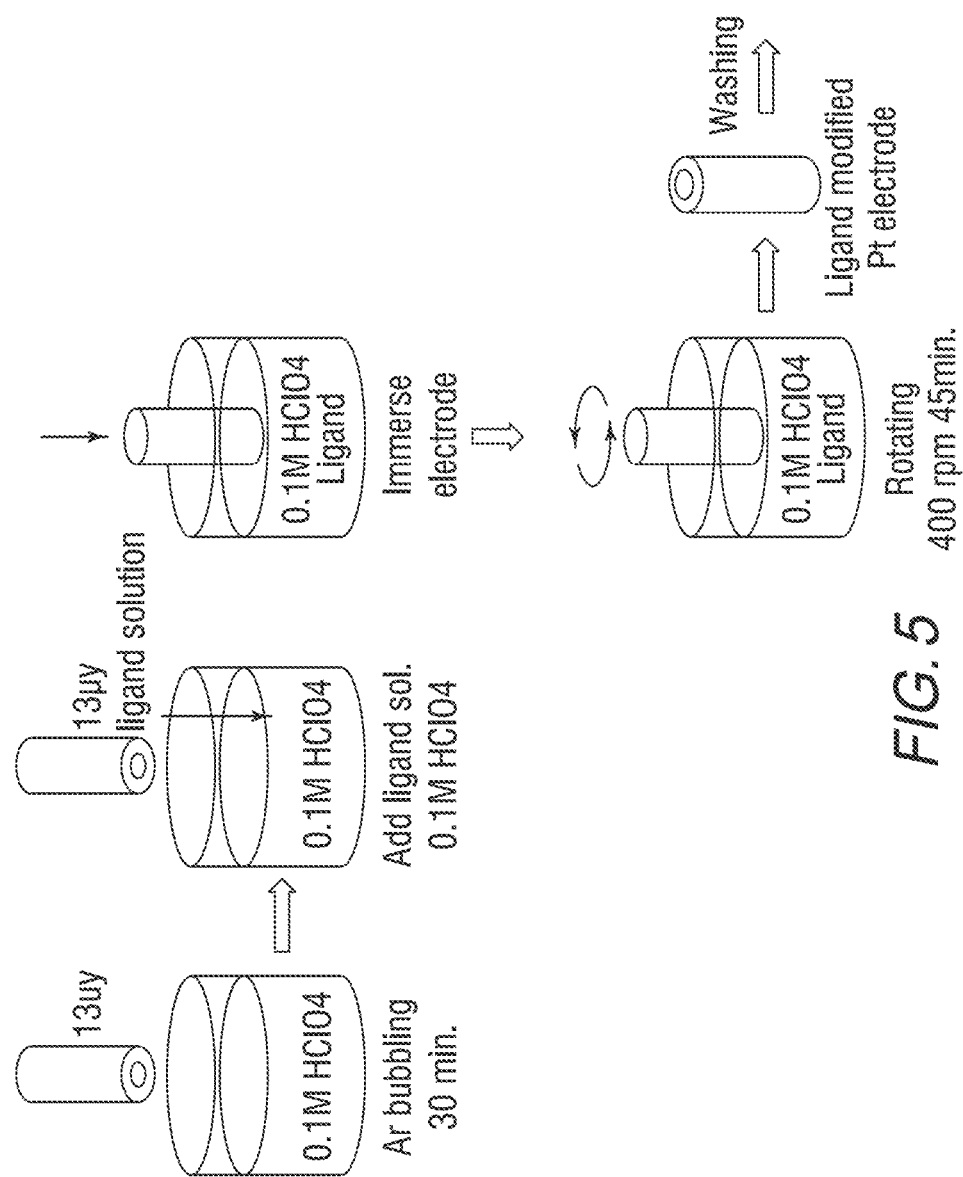
FIG. 5 shows a schematic drawing of the method to modify the surface of a Pt disk electrode according to an aspect of the present disclosure.

Surface Modification of Pt Disk Electrode:

A Pt disk electrode was immersioned in 0.1M HClO4, followed by adding the desired amount of 13 μM-ligand solution. In the solution, the electrode was rotated at 400 rpm for 45 min. Finally, the modified electrode was rinsed by DI water three times. This method is shown schematically in FIG. 5

Surface Modification of Pt Powder Catalysts:

50 mg Pt/C or Pt alloy catalyst and the desired amount of ligand was placed in 100 ml DI water, respectively. After 15 min. sonication, the catalysis dispersed solution was added into the ligand solution. After 5 min. sonication, the mixed solution was stirred at 300 rpm for 15 min. Finally, the obtained powder was further dried at 60° C. overnight. This method is shown schematically in FIG. 6.

Ink Preparation:

Catalyst ink was prepared by mixing 8.34 mg sample powders with 8 ml DI water, 2 ml iso-propanol, and 45.7 μl Nafion ionomer (Nafion DE 520) and bath sonicating for 60 minutes in ice bath.

RDE Coating:

A glassy carbon electrode (5 mm in diameter) was polished and rinsed to make sure the surface was clean before coating. 5 μl fresh ink was dropped onto the glassy carbon electrode. The electrode was mounted to a rotator (Pine Instrument rotator upside down) and was rotated at a speed of 400 rpm and dried.

Electrochemical Test:

The electrochemical experiments were conducted using a Pine Instrument RDE workstation. A three-electrode system, consisting of the catalyst film-coated glassy carbon working electrode, a platinum wire counter electrode, and a RHE reference were used for all electrochemical measurements. The electrolyte used was 0.1 M HClO$_4$ or 0.05 M H$_2$SO$_4$ which was freshly prepared before the test.

Test Fuel Cell Fabrication and Evaluation

A fuel cell was prepared as depicted in FIG. 21 and according to the following parameters.

Anode (TKK TEC10EA30E)—0.05 mg/cm$^2$ Pt
Cathode (JM 0.2 mg/cm$^2$ Pt (Ref.)—0.23 mg/cm$^2$ Pt-5-bromopyridine-2-thiol modified CCM size: 2×2 cm
Decal condition: 130° C., 0.5 Mpa, 5 minutes
I-V performance: 70° C., 100RH, 150 Kpa (abs) at H$_2$/Air (0.5/2.0 NLPM)

The invention claimed is:

1. An oxygen reduction reaction (ORR) catalyst, consisting of:
   a solid platinum metal, solid platinum metal alloy or a combination of a solid platinum metal and solid platinum alloy; and
   a carbon support;
   wherein the solid platinum metal and/or platinum alloy metal has a surface complexed with a monodentate thiol ligand comprising an aromatic or heteroaromatic ring containing at least one of a bromide and an iodide substituent.

2. The ORR catalyst according to claim 1, wherein the monodentate thiol ligand comprises an aromatic ring and the aromatic ring is a phenylene group.

3. The ORR catalyst according to claim 2, wherein the monodentate thiol ligand is a thiophenol substituted with at least one of a bromide group and an iodide group.

4. The ORR catalyst according to claim 1, wherein the monodentate thiol ligand comprises a heteroaromatic ring and the heteroaromatic ring is a 5 or 6 membered ring containing at least one of N, O and S.

5. The ORR catalyst according to claim 4, wherein the heteroaromatic ring is one selected from the group consisting of furan, thiophene, pyrrole, pyridine, pyrimidine and pyrazine.

6. The ORR catalyst according to claim 5, wherein the monodentate thiol ligand is a mercaptopyridine substituted with at least one of a bromide group and an iodide group.

7. The ORR catalyst according to claim 4, wherein the monodentate thiol ligand is 5-bromopyridine-2-thiol.

8. The ORR catalyst according to claim 1, wherein the wherein a surface of the Pt metal available for catalyst activity is at least 50% of a total Pt surface area.

9. The ORR catalyst according to claim 1, wherein the solid catalyst further comprises an alloy metal.

10. The ORR catalyst according to claim 9, wherein the alloy metal is selected from the group consisting of the transition metals.

11. The ORR catalyst according to claim 10, wherein the alloy metal is selected from the group consisting of Fe, Co, Ni and Cu.

12. The ORR catalyst according to claim 11, wherein the alloy metal is Co.

13. The ORR catalyst according to claim 1 wherein the carbon support comprises a conductive carbon.

14. The ORR catalyst according to claim 13, wherein the conductive carbon is selected from the group consisting of carbon black, acetylene black, synthetic graphite, natural flake graphite, carbon nanotubes, fullerenes, hard carbon, and mesoporous carbon.

15. A membrane-electrode assembly for oxygen reduction, comprising:
    a solid catalyst layer comprising the ORR catalyst according to claim 1, wherein
    the solid catalyst layer is disposed between an ionomeric membrane and a gas diffusion layer.

16. A polymer electrolyte fuel cell comprising the membrane-electrode assembly of claim 15.

* * * * *